United States Patent [19]

Pesta et al.

[11] Patent Number: 5,080,437

[45] Date of Patent: Jan. 14, 1992

[54] SELF-ADJUSTING HEADREST GUIDE ARRANGEMENT

[75] Inventors: Christopher J. Pesta, Shelby Township, Macomb County; Michael J. Sweers, Williamston, both of Mich.

[73] Assignee: Chrysler Corporation, Highland Park, Mich.

[21] Appl. No.: 628,039

[22] Filed: Dec. 17, 1990

[51] Int. Cl.⁵ .................................................. A47C 7/36
[52] U.S. Cl. ...................................... 297/410; 248/408
[58] Field of Search ................................ 297/391, 410; 248/221.4, 407, 408

[56] References Cited

U.S. PATENT DOCUMENTS

| | | | |
|---|---|---|---|
| 4,489,979 | 12/1984 | Zyngier | 297/410 X |
| 4,679,850 | 7/1987 | Branchi et al. | 297/410 |
| 4,854,642 | 8/1989 | Vidwans et al. | 297/410 |
| 4,976,493 | 12/1990 | Frankila | 297/410 |

Primary Examiner—Peter R. Brown
Attorney, Agent, or Firm—Edward P. Barthel

[57] ABSTRACT

A one-piece guide sleeve for a vehicle seatback headrest support post enabling infinite vertical movement of the headrest. The guide sleeve provides integral locking prongs which normally apply frictional self-effort force to the support post. Conforming notches on the post are adapted to trap the prongs in a self-locking manner to prevent unintentional removal of the headrest assembly from the seatback.

4 Claims, 2 Drawing Sheets

SELF-ADJUSTING HEADREST GUIDE ARRANGEMENT

BACKGROUND OF THE INVENTION

This invention relates to headrests for motor vehicle seats and more particularly to a self-adjusting guide sleeve arrangement for the headrest support posts.

The U.S. Pat. No. 4,854,642 issued Aug. 8, 1989 to Vidwans et al. entitled Head Restraint Guide Assembly discloses a prior art arrangement for adjustably mounting a pair of headrest support posts to a vehicle seat backrest. The Vidwans et al. restraint assembly has a bushing member adapted for retaining and guiding a post supporting the head restraint pad of a motor vehicle seat back. The bushing is installed within the seat back and allows the head restraint pad to be positioned at various vertical positions to suit individual seat occupants. The head restraint post has a plurality of detent notches such that various indexed positions of the head restraint pad are provided. The detent notches of the post have ramped cam surfaces enabling the pad to be moved between the detent positions by exerting axial loads on the post. The retainer notch engages the lug to prevent inadvertent withdrawal of the head restraint pad. Complete withdrawal, however, is provided by an actuator mechanism which urges the lug to withdraw it from engagement with the post retainer notch. The release actuator includes a leaf spring element, having an end which can be depressed downwardly to exert an outward biasing force on the detent lug, causing the lug to be disengaged from the retainer notch enabling the head restraint post to be withdrawn from the head restraint.

Prior art FIGS. 10 and 11 disclose an existing plastic adjustment sleeve assembly 20' for a headrest support post 22' of a vehicle seatback headrest. The sleeve assembly includes an upper radially extending locating flange 24', an intermediate cylindrical engaging upper head 28'. The head portion 26' has a pair of diametrically opposed detent engaging lugs 30' each formed on the free upper end of an integral finger portion 32' projecting vertically upwardly from its associated head portion vertical slot 34'. Each finger portion detent engaging lug 30' is designed for radially inward resilient biased engagement in an associated one of a pair of diametrically opposed complementary shaped V-notches 36' provided in the post 22'.

As best seen in FIG. 10 an annular exterior groove 38' is formed around the upper end of the head portion 26' and the detent lugs 30' so as to capture therein a coiled wire spring 40'. Thus, upon vertical travel of the sleeve assembly 20' on the post 22' the spring 40' allows the pair of lugs 30' to flex radially outwardly from an associated notch 36' for snap-action releasable engagement into a next adjacent vertically aligned post notch (not shown).

The prior art sleeve assembly 20' includes a lower integral spring finger 42' formed with a locking tab 44' adapted to engage the lower edge of a mounting socket (not shown) to prevent inadvertent withdrawal of the sleeve assembly therefrom. The sleeve assembly head portion 26' has a radial shoulder 46' adapted to seat on the upper end of the mounting socket together with a spline 48' adapted to be received in a socket slot (not shown) to prevent relative rotation between the sleeve assembly and the socket.

SUMMARY OF THE INVENTION

It is an object of the present invention to provide an improved one-piece molded plastic adjustment guide sleeve which surrounds a vehicle seatback headrest support post enabling infinite vertical movement of the headrest while obviating inadvertent slippage during vehicle operation.

It is another object of the present invention to provide an improved one-piece molded plastic adjusting guide sleeve as set forth above wherein integral locking prongs apply spring frictional self-effort force to the headrest support post while positioning and retaining the guide sleeve in a mounting socket fixed to the vehicle seatback frame. The locking prongs are adapted to be trapped in associated conforming notches in a self-locking manner uniquely designed to prevent unintentional removal of the headrest assembly from the seatback.

BRIEF DESCRIPTION OF THE DRAWINGS

These and other features and advantages of the present invention will appear from the following written description and drawings in which.

DESCRIPTION OF THE INVENTION

Figure 1:
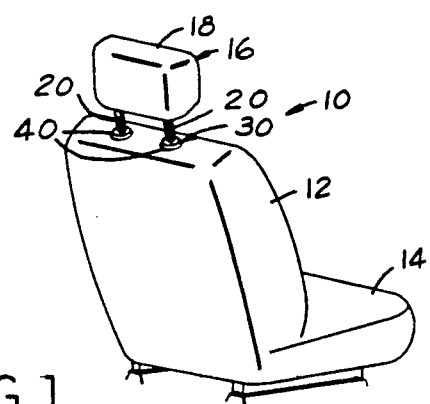
FIG. 1. is a perspective view of a vehicle seat showing the its full vertical position.

Referring now to FIG. 1 there is shown a vehicle seat 10 including a seat cushion 12 and a seatback 14 having a padded headrest assembly 16 mounted on the seatback 12. The headrest assembly 16 comprises a pad 18 and a pair of circular cross sectioned downwardly extending metal support posts 20. As the support post mounting arrangements are identical only one will be described in detail.

Figure 2:
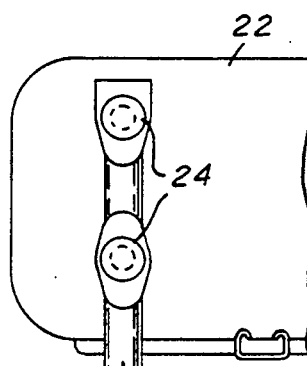
FIG. 2 a fragmentary front elevational view showing the vehicle seat and headrest framework together with the headrest post guide arrangement of the present invention an intermediate raised position.
Figure 2:
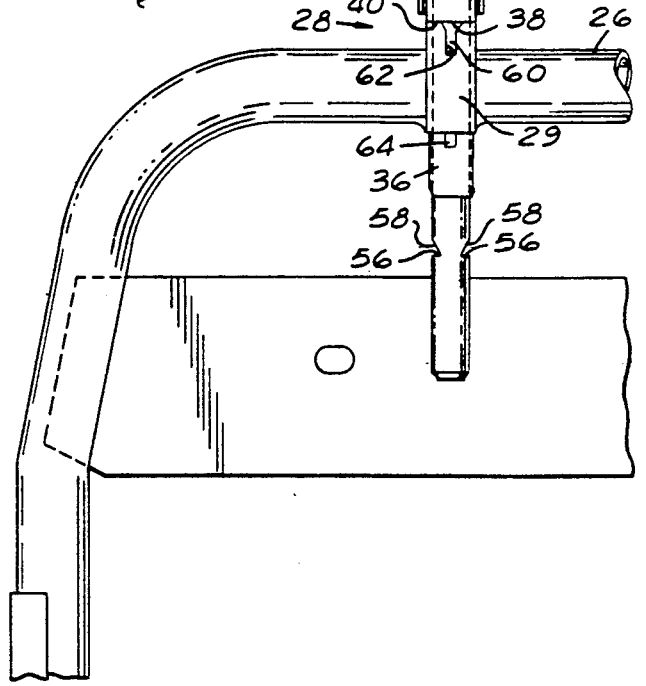

With reference to FIG. 2 the headrest assembly further comprises a rectangular shaped armature plate 22 to which the upper end of the support post 20 is secured by suitable fasteners 24. The support post 20 extends downwardly from the armature plate and is adjustably supported on seatback frame 26 by means of a mounting assembly generally indicated at 28. The mounting assembly comprises a cylindrical mounting socket 29 secured as by welding to the frame 26. A one-piece tubular guide sleeve, generally indicated at 30 in FIG. 3, is molded of suitable flexible elastomeric material and has a central bore 32 adapted to telescopically receive the support post therethrough.

The guide sleeve 30 is formed with an upper circular head portion 34 having a first external diameter and a lower circular body portion 36 having a second 1 external diameter a predetermined dimension less than the first diameter establishing a radial shoulder 38 at the 1 lower end of the head portion 34. A laterally extending headrest pad 18 to trim the opening in the seatback 12.

Figure 5:
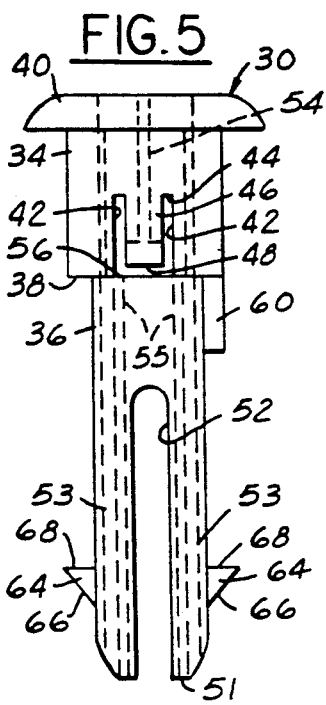
FIG. 5 is a side elevational detail view of the one-piece plastic guide sleeve of FIG. 4.
Figure 6:
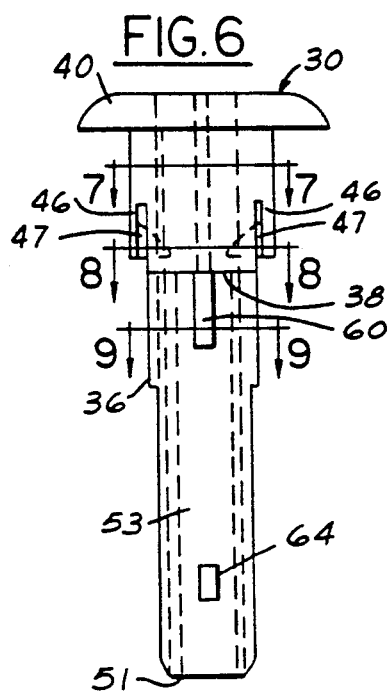
FIG. 6 is a view similar to FIG. 5 with the guide sleeve rotated ninety degrees.
Figure 7:
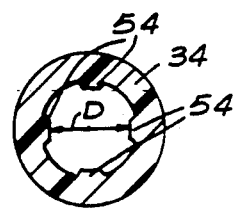
FIG. 7 is a horizontal sectional view taken on the line 7—7 of FIG. 6.
Figure 8:
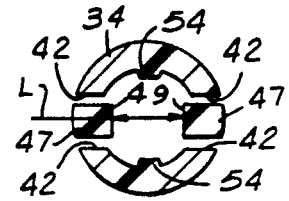
FIG. 8 is a horizontal sectional view taken on the line 8—8 of FIG. 6.

As best seen in FIGS. 5 and 6 the guide sleeve head portion 34 if formed with a plurality of elongated rectangular shaped upper slots extending upwardly a predetermined axial dimension from the shoulder 38. In the disclosed embodiment a pair of upper slots are provided arranged in diametrically opposed relation and symmetrically disposed about a vertical plane of symmetry which includes the transverse construction line "L" shown in FIG. 8. Each upper slot is formed with a pair of opposed vertical side edges 42 terminating at their upper ends in a horizontal edge 44.

Figure 3:
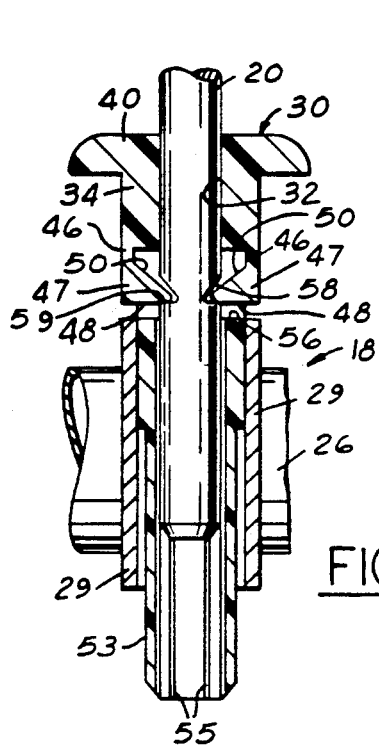
FIG. 3 is an enlarged fragmentary vertical sectional view, partly in elevation, showing the headrest support post guide arrangement in its fully raised locked position.

With reference to FIG. 3 an integral resilient spring finger 46 extends downwardly from the horizontal upper edge 44 in its free state and has the lower end thereof formed with a locking prong 47. Each locking prong 47 has a right-triangular vertical section defined by a radially inwardly extending base 48 and a downwardly and radially inwardly extending slope 50 intersecting the base 48 at the prong inner end 49 at an acute angle of the order of 45 degrees. It will be noted in FIG. 5 that each prong base 48 is spaced a predetermined axial distance from the shoulder 38.

Figure 3A:
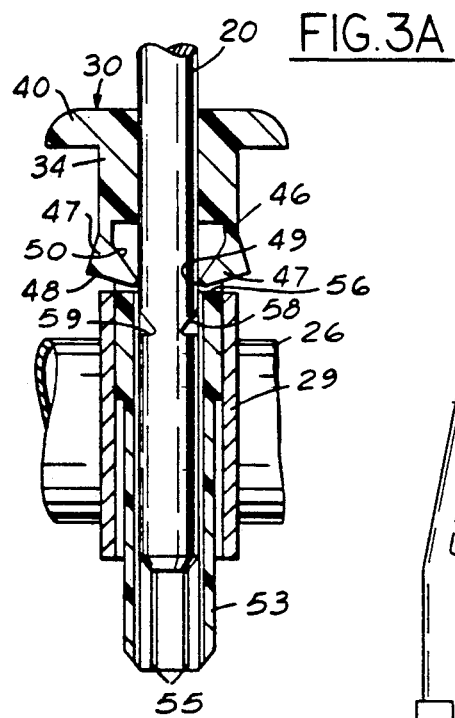
FIG. 3A is a view similar to FIG. 3 showing the support post in an intermediate operating position.

With reference to FIG. 3A the locking prongs 47, in their outwardly resiliently flexed position, are shown with their radially inner ends 49 spring biased or urged into frictional contact with the support post 20 with the frictional force creating an operational effort opposing headrest travel. Thus, self-effort adjustment is the direct result of the resilient locking prong inner ends 49 accepting the headrest post outer diameter variations.

It will be observed in FIG. 5 the guide sleeve lower body portion 36 is formed with a pair of lower vertically extending elongated lower slots 52 positioned in diametrically opposed relation. The slots 52 are open at their lower terminus, i.e. sleeve lower end 51, forming a pair of mirror image resilient bifurcated legs 53 adapted to be flexed inwardly in a manner to be explained.

With reference to FIGS. 4 through 7 it will be seen that the guide sleeve upper head portion internal bore 32 is formed with a plurality of uniformly spaced integral radially inwardly projecting bearing portions. In the preferred embodiment the bearing portions are in the form of a set of four ninety degree circumferentially spaced internal bearing ribs 54 which extend longitudinally from the sleeve upper end to the shoulder 38. It will be seen in FIGS. 5, 7 and 8 that the one pair of diametrically opposed ribs 54 are aligned on center with respective spring fingers 46.

Figure 9:
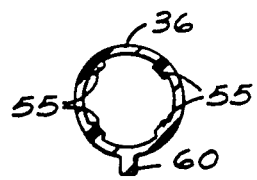
FIG. 9 is a horizontal sectional view taken on the line 9—9 of FIG. 6.
Figure 10:
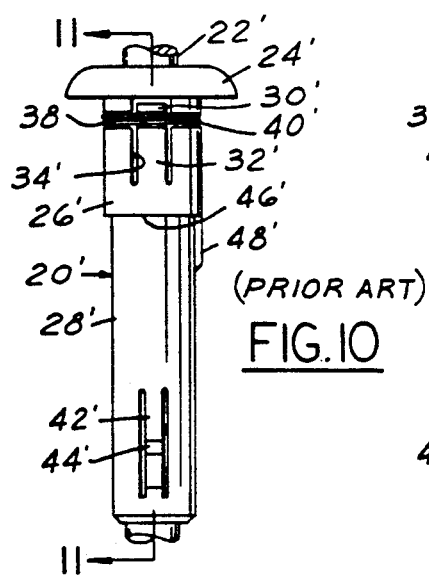
FIG. 10 fragmentary side elevational view of a prior art headrest post guide sleeve.
Figure 11:
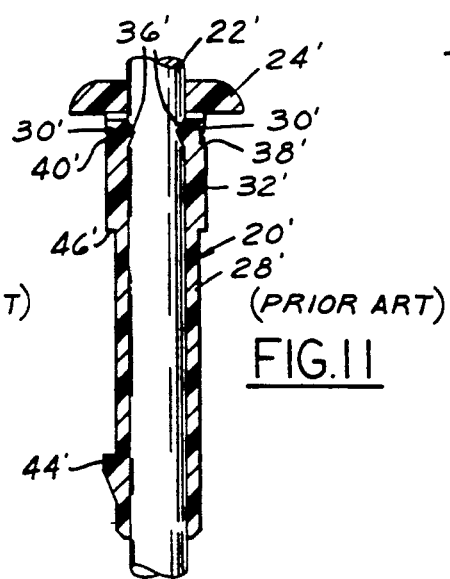
FIG. 11 a fragmentary vertical sectional view taken on the line 11—11 of FIG. 10.

In FIGS. 5, 6, and 9 it will be observed that the lower body portion internal bore 32 is formed with a set of four ninety degree circumferentially spaced internal bearing ribs 55 which extend longitudinally from the shoulder 38 to the lower free end of the body portion.

Figure 4:
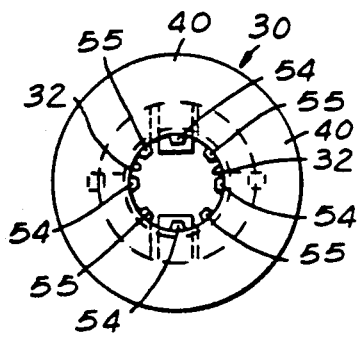
FIG. 4 is an enlarged top elevational detail view of the one-piece tubular guide sleeve of the instant invention.

In FIGS. 4 and 9 the body portion lower internal bearing ribs 55 are shown rotated forty five degrees from the orientation of the upper head portion internal bearing ribs 54. This rotation is required because the lower slots 52 prevent the upper bearing ribs 54 from extending the full height of the guide sleeve.

It will be appreciated that as the one-piece guide sleeve 30 is designed to be molded from a suitable elastomeric material having a predetermined flex modulus resulting in the sets of ribs 54 and 55 having a compressibility in a radial direction enabling the post 20 to be snugly received in the central bore for selective vertical adjustment. The set of ribs define an internal ribbed cylindrical surface having a predetermined internal diameter "D" (FIG. 7) substantially equal to but slightly less than the external diameter of the support post 20. Thus, the arrangement of the upper 54 and lower 55 sets of bearing ribs provide an internal ribbed surface enabling a resilient predetermined frictionally engagement press fit with respect to the support post outer surface. As a result the guide sleeve 30 controls, in a self-effort manner, the adjustment force required by the operator to slide each support post 20 and thus the headrest assembly to an infinite number of vertical locations. It will be appreciated that the self-effort sliding fit of each post 20 relative to its associated set of upper 54 and lower 55 ribs, by virtue of the sleeve material predetermined flex modulus, also functions to prevent a rattling condition between the headrest posts 20 and their associated sleeves 30.

As seen in FIGS. 2 and 3 the support post 18 is formed with a single set of notches adjacent the lower end of the post which in the preferred embodiment comprises a pair of diametrically opposed notches. Each notch is defined by a horizontal surface 56 intersected at its inner terminus by an inwardly and downwardly angled ramped cam surface 58 at an acute angle conforming to the acute angle defined by each prong base 48 and slope 50. It will be noted in FIG. 3 that each prong base 48 is vertically spaced from its associated upper slot lower edge 59 a predetermined vertical dimension to allow outward flexing of the prong 47.

With reference to FIGS. 5 and 6 the lower body portion 36 is formed with an axially extending locking spline 60 having its upper end flush with the shoulder 38. As seen in FIG. 2 upon the lower body portion 36 being inserted in the mounting socket 29 the locking spline is positioned in vertical alignment with a conforming elongated recess 62 in the upper edge of the socket. Upon guide sleeve being moved downwardly the locking spline is received in the recess 62 enabling the shoulder 38 to seat on the upper edge of the socket preventing rotation of the sleeve in the socket.

The sleeve lower body portion is provided with a pair of diametrically opposed retaining tabs 64 adjacent the lower end of the bifurcated legs 53. The retaining tabs have a triangular shape providing a downwardly and inwardly sloped cam edge 66 adapted to engage the mounting socket upper edge upon insertion of the sleeve therein. The cam edges 66 flex the legs 53 inwardly enabling the downward passage of the sleeve in the socket. As seen in FIG. 2 the retaining tabs are axially spaced to return, with the bifurcated legs 53, to their free state upon the shoulder 38 being seated on the socket upper edge. In this way the retaining tabs are positioned with their upper horizontal edges 68 juxtaposed the lower edge of the socket 29 thereby axially retaining the sleeve 30 therein.

The one-piece self-effort headrest adjusting sleeve 30 provides an anti-removal lock geometry as the locking prongs 47 prevent unintentional vertical removal of the headrest assembly in conjunction with their associated support post notches. In this regard it will be appreciated that as the upward axial pull on the support post 20 is increased each prong slope 50 will engage its associated notch ramped cam surface 58 causing the prongs 47 to be forced radially inwardly increasing the locking force tending to retain each prong 47 in its associated notch.

Thus, applicants' invention allows the headrest assembly 16 to be adjustably raised by operator self-effort to an infinite number of positions until the locking prongs 47 lockingly engage their associated support post notch. Each resiliently outwardly forced spring finger 46 applies a radially inward prong inner end 49 frictional engaging force on the support rod which, together with the upper and lower set of ribs 54 and 55 frictional bearing surfaces, allows infinite vertical movement of each support post 20 relative to its associated guide sleeve 30 while obviating inadvertent slippage of the post during vehicle operation.

Although only one embodiment, it is apparent that been illustrated and described, it is apparent that modifications and variations will readily come to mind of a person skilled in the art which modifications and variations do not fall outside the scope of the invention as defined by the following claims.

What is claimed is:

1. An assembly for enabling a headrest to be moved with respect to a motor vehicle seat comprising at least one post connected to and supporting the headrest, said post formed with retainer notch means, a hollow elongated cylindrical bushing mounted to the seat providing an inner socket for receiving a tubular bushing therein, said bushing having a central bore adapted to telescopically receive said post therethrough, latch means on said bushing having prong means engagable with said post notch means, and means biasing said prong means into engagement with said retainer notch means for inhibiting the withdrawal of said post from said bushing, the improvement comprising:

a one-piece tubular bushing molded of flexible elastomeric material formed with an upper head portion having a first diameter and a lower body portion having a second diameter a predetermined dimension smaller than said first diameter whereby a radial shoulder is defined therebetween, a radial flange integral with said head portion upper end thereof, said bushing formed with a central bore adapted to telescopically receive said post therethrough;

said head portion formed with a plurality of diametrically opposed rectangular shaped upper slots extending upwardly a predetermined axial dimension from said shoulder such that each said upper slot terminates in a transverse upper edge, an integral spring finger extending vertically downwardly in its free state from each said upper edge, each said spring finger having the lower end thereof formed with a prong having a right-angle triangular shaped vertical section;

each said spring finger prong defined by a radially inwardly extending base and a downwardly and inwardly extending slope intersecting the base at the spring finger prong inner end thereof at an acute angle, each said spring finger prong in its associated free state having its inner end projecting into said central bore a predetermined radial dimension, whereby with said post received in said bore each said spring finger prong is flexed radially outwardly such that each said prong inner end applies a predetermined frictional engagement force on said post;

said bushing body portion adapted to be received in said mounting tube with said bushing shoulder seated on the bushing upper end thereof, said post having the lower end thereof formed with a predetermined number of notches equal to the number of said locking prongs, each said notch defined by a horizontal facet and an inwardly and downwardly extending ramp intersecting said facet at an acute angle conforming to the acute angle defined by each said prong base and slope, each said notch adapted be positively engaged by an associated locking prong thereby limiting the upward travel of said post in said bushing central bore;

said bushing central bore having the inner surface formed with a uniform pattern of integral radially inwardly projecting bearing portions having a predetermined flex modulus, said bearing portions providing a predetermined frictional contact area with said post which together with the spring frictional engagement force applied by each said prong inner end establishing a post frictional sliding resistance allowing infinite self-effort vertical adjustable movement of said post in said bushing central bore while obviating inadvertent post slippage.

2. The one-piece tubular bushing as set forth in claim 1, wherein said bearing portions in the form of a plurality of longitudinally extending bearing ribs integrally formed on the central bore internal surface thereof.

3. The one-piece tubular bushing as set forth in claim 2, wherein said sleeve upper body portion plurality of upper slots comprising a pair of diametrically opposed upper slots, said sleeve lower body portion formed with a pair of longitudinally extending diametrically opposed lower slots terminating in said sleeve lower edge thereof, each said lower slots in longitudinal alignment with an associated upper slot and defining a pair of diametrically opposed bifurcated legs.

4. The one-piece tubular bushing as set forth in claim 3, wherein said plurality of longitudinally extending internal bearing ribs in the from of an upper set of bearing ribs substantially coextensive with said upper body portion and a lower set of bearing ribs substantially coextensive with said lower body portion, said upper set of bearing ribs being uniformly spaced at ninety degree intervals such that a pair of diametrically opposed upper ribs are aligned with respective ones of said upper slots, and said lower set of bearing ribs being uniformly spaced at ninety degree intervals with each said lower rib offset forty five degrees from each said upper rib.

* * * * *